No. 866,193. PATENTED SEPT. 17, 1907.
F. G. CLARK.
TROLLEY GUIDE.
APPLICATION FILED FEB. 20, 1907.
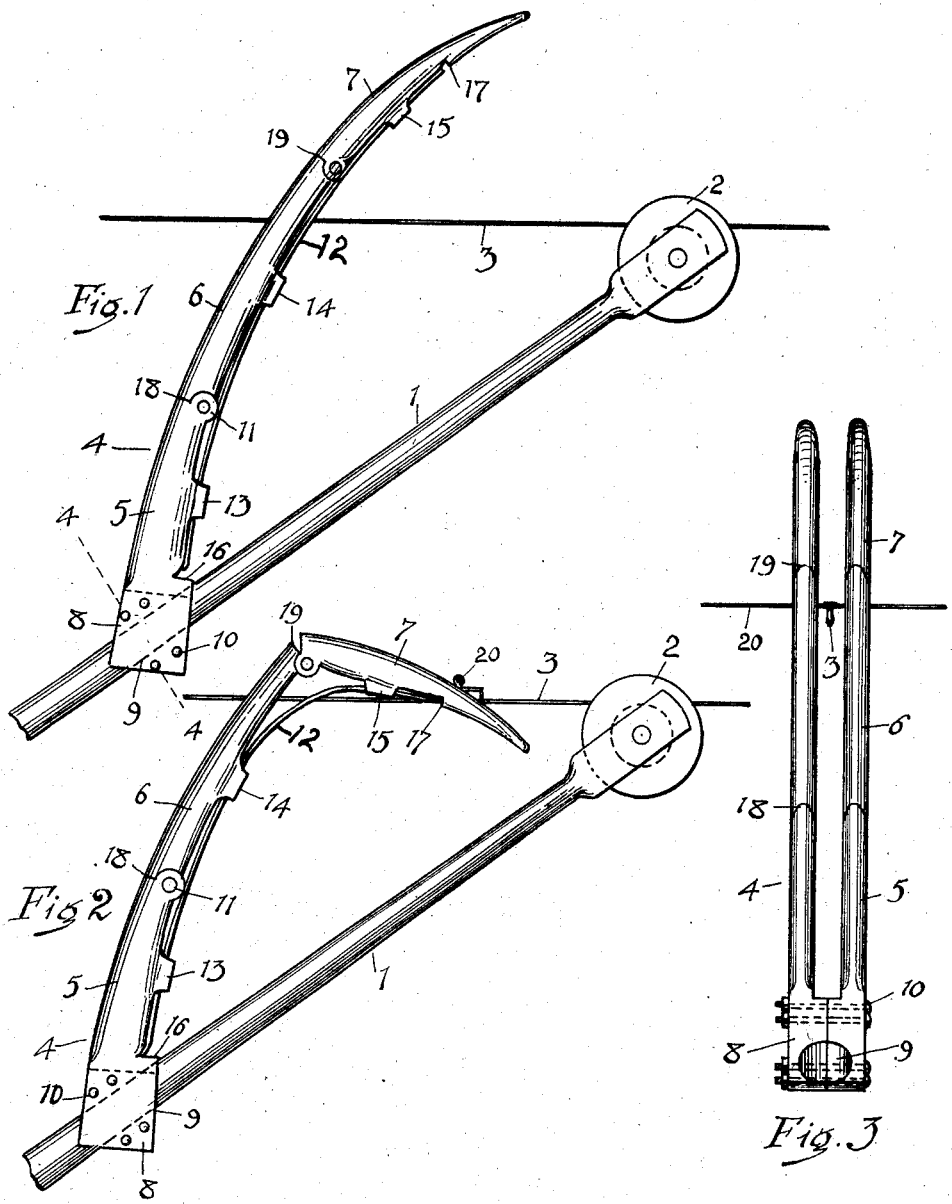
Witnesses:
Inventor,
Frank G. Clark,
By F. M. Wright,
Attorney.

UNITED STATES PATENT OFFICE.

FRANK G. CLARK, OF SAN FRANCISCO, CALIFORNIA.

TROLLEY-GUIDE.

No. 866,193.  Specification of Letters Patent.  Patented Sept. 17, 1907.

Application filed February 20, 1907. Serial No. 358,387.

*To all whom it may concern:*

Be it known that I, FRANK G. CLARK, a citizen of the United States, residing at San Francisco, in the county of San Francisco and State of California, have invented new and useful Improvements in Trolley-Guides, of which the following is a specification.

The object of the present invention is to provide a trolley guide for electric cars which will insure the continued contact of the trolley wheel with the overhead wire carrying the current, in turning curves and in passing underneath the cross or supporting wires.

In the accompanying drawing, Figure 1 is a side view of the upper portion of a trolley pole with the guide attached thereto; Fig. 2 is a similar view showing the trolley passing underneath a cross wire; Fig. 3 is a front view of the guide detached.

Referring to the drawing, 1 indicates a trolley pole, carrying on its end the usual trolley wheel 2, traveling beneath the wire 3. Secured upon said pole at a suitable distance from the wheel is a guide 4. Said guide is in the form of a fork, each tine of which is made in three sections 5, 6, 7. Each lower section 5 is formed with an enlarged butt 8, and the butts of the two sections are formed on their inner sides which face each other with half-round grooves or recesses 9, which fit against the trolley pole. Said sections 5 are clamped to the trolley pole by means of bolts 10, passed through said butts and secured by nuts. The longitudinal direction of the recesses formed in the butts is such that the lower sections of the guide extend nearly vertical, but slightly rearwards, when the trolley pole extends from the top of the electric car at the usual inclination. Upon the upper ends of the inner or lower sections 5 are hinged, as shown at 11, the intermediate sections 6, and upon the upper ends of these sections are hinged in turn the lower ends of the outer sections 7. For each tine of the guide there is a flat spring 12, which passes through slide ways 13, 14, 15 formed on the rear edges of the sections 5, 6, 7, respectively, the ends of said spring being adapted to abut against shoulders 16, 17, formed on the rear edges of the inner and outer sections, 5, 7, the said shoulders thus retaining said spring in position. The tendency of each spring is to form the sections of the corresponding tine into a straight line with each other, but this movement of the sections is limited by shoulders 18, 19, formed on the outer edges of the sections at their hinges, so that, when fully extended by the spring, the sections curve continuously rearwards from the lower section.

The guide is secured at such a point of the pole that the trolley wire 3 passes between the middle sections near their upper ends. On passing beneath a cross wire 20 which supports the trolley wire, first the middle sections 6 are bent down until the cross wire can pass over their upper ends, and then, after the wire has been so passed over said ends, said middle sections return to their original position under the action of the springs 12, but the upper sections are still bent downwards and backwards in the position shown in Fig. 2, traveling under the cross wire until they pass the same, whereupon they immediately spring upwards on opposite sides of the trolley wire. As they travel onwards in this position the trolley wheel is compelled to follow in such a path as to engage the trolley wire on passing the cross wire. Consequently, said wheel cannot escape from the overhead conducting wire even when passing around a curve.

I claim:—

1. A trolley guide consisting of a fork secured to the trolley pole near its upper end, each tine of the fork being made in three sections pivotally connected by two knuckle joints, and resilient means for maintaining said sections in a continuous line with each other, said means permitting said sections to bend at the joints when passing a cross wire supporting the overhead or conducting wire, substantially as described.

2. A trolley guide consisting of a fork, the tines of the fork being separable and each made in sections, the lower sections having butts with half round grooves adapted to encircle a trolley pole, screws for clamping said butts upon said pole, the sections of each tine being jointed together, and having shoulders limiting their forward movement, but freely flexible rearwardly, and a spring secured upon the rear edge of each tine for pressing said sections forwards, substantially as described.

3. A trolley guide consisting of a fork, the tines of the fork being separable and each made in sections, the lower sections having butts with half round grooves adapted to encircle a trolley pole, screws for clamping said butts upon said pole, the sections of each tine being jointed together, and having shoulders limiting their forward movement but freely flexible rearwardly, each section having formed on its rear edge a guideway for a spring, and the outer and inner sections having shoulders to arrest the ends of the spring, and a spring passing through the guideways of the sections of each tine, substantially as described.

In testimony whereof I have hereunto set my hand in the presence of two subscribing witnesses.

FRANK G. CLARK.

Witnesses:
FRANCIS M. WRIGHT,
D. B. RICHARDS.